(12) United States Patent
Lin

(10) Patent No.: US 8,312,477 B2
(45) Date of Patent: Nov. 13, 2012

(54) MOBILE DEVICE WITH MULTIPLE OPERATING SYSTEMS AND METHOD FOR SHARING A WIRELESS COMMUNICATION MODULE BETWEEN OPERATING SYSTEMS THEREOF

(75) Inventor: Chun-Hao Lin, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 973 days.

(21) Appl. No.: 12/204,776

(22) Filed: Sep. 4, 2008

(65) Prior Publication Data

US 2009/0061838 A1 Mar. 5, 2009

Related U.S. Application Data

(60) Provisional application No. 60/970,244, filed on Sep. 5, 2007.

(51) Int. Cl.
*G06F 9/52* (2006.01)
*G06F 9/54* (2006.01)
*G01C 21/00* (2006.01)

(52) U.S. Cl. .......................... 719/319; 719/313; 701/400

(58) Field of Classification Search .................. None
See application file for complete search history.

(56) References Cited

U.S. PATENT DOCUMENTS

| | | | |
|---|---|---|---|
| 6,289,391 B1 | 9/2001 | Smith et al. | |
| 6,496,847 B1 | 12/2002 | Bugnion et al. | |
| 6,976,180 B2 | 12/2005 | Cupps et al. | |
| 7,020,488 B1 | 3/2006 | Bleile et al. | |
| 7,127,723 B2 * | 10/2006 | Endo et al. | 719/319 |
| 7,158,972 B2 | 1/2007 | Marsland | |
| 7,184,003 B2 | 2/2007 | Cupps et al. | |
| 2001/0029550 A1 * | 10/2001 | Endo et al. | 709/319 |
| 2002/0059080 A1 | 5/2002 | Kasirer et al. | |
| 2003/0220141 A1 | 11/2003 | Corrigan et al. | |
| 2003/0226044 A1 | 12/2003 | Cupps et al. | |
| 2005/0071768 A1 | 3/2005 | Araki et al. | |
| 2005/0091436 A1 | 4/2005 | Huang | |
| 2005/0182922 A1 | 8/2005 | Guo et al. | |

(Continued)

FOREIGN PATENT DOCUMENTS

CN 101022521 8/2007

(Continued)

OTHER PUBLICATIONS

"Search Report of European counterpart application of co-pending Application", issued on Mar. 23, 2009, p. 1-p. 6.

(Continued)

*Primary Examiner* — Qing Wu
(74) *Attorney, Agent, or Firm* — Jianq Chyun IP Office

(57) ABSTRACT

A mobile device capable of running at least two operating systems (OS), and a method for sharing a wireless communication module between the operating systems are provided. A hardware controller is configured to communicate between the two operating systems. First, a first operating system encodes an instruction into a first uniform message and transmits the first uniform message to a second operating system, in which the wireless communication module is installed, through the hardware controller. Afterwards, the second operating system enables the wireless communication module to start receiving positioning data according to the first uniform message, encodes the data into a second uniform message, and sends the second uniform message back to the first operating system through the hardware controller. Finally, the first operating system decodes the second uniform message into positioning data.

16 Claims, 5 Drawing Sheets

U.S. PATENT DOCUMENTS

| | | | |
|---|---|---|---|
| 2005/0266881 | A1 | 12/2005 | Keppler et al. |
| 2006/0010314 | A1 | 1/2006 | Xu |
| 2006/0123432 | A1 | 6/2006 | Bendapudi et al. |
| 2006/0161985 | A1 | 7/2006 | Zhao |
| 2006/0235898 | A1 | 10/2006 | Loveland |
| 2006/0236376 | A1 | 10/2006 | Liu et al. |
| 2007/0005946 | A1 | 1/2007 | Zimmer et al. |
| 2007/0022258 | A1 | 1/2007 | Panabaker et al. |
| 2007/0038875 | A1 | 2/2007 | Cupps et al. |
| 2007/0043961 | A1 | 2/2007 | Cupps et al. |
| 2007/0140199 | A1 | 6/2007 | Zhao et al. |
| 2008/0177905 | A1 | 7/2008 | Ohta et al. |
| 2008/0222076 | A1 | 9/2008 | Dandekar et al. |
| 2009/0059965 | A1 | 3/2009 | Lin et al. |
| 2009/0064186 | A1 | 3/2009 | Lin |

FOREIGN PATENT DOCUMENTS

| | | |
|---|---|---|
| EP | 1526455 | 4/2005 |
| EP | 1796011 | 6/2007 |
| TW | 200523752 | 7/2005 |
| WO | 2005055117 | 6/2005 |
| WO | 2006088809 | 8/2006 |

OTHER PUBLICATIONS

"Search Report of European counterpart application of co-pending Application", issued on Jan. 29, 2009, p. 1-p. 8.

"Office Action of Taiwan Counterpart Application", issued on Jun. 21, 2011, p. 1-p. 3.

"1st Office Action of China Counterpart Application of the co-pending application", issued on Jul. 24, 2009, p. 1-p. 5.

Jay Munro, "Virtual Machines & VNware, Part II", http://www.extremetech.com/article2/0.2845.10402.00asp, retrieved on Dec. 28, 2001.

"Second Office Action of China Counterpart Application", issued on Mar. 8, 2011, p. 1-p. 17.

"First Office Action of Co-pending U.S. Appl. No. 12/204,780", issued on Jan. 24, 2012, in which the listed references were cited.

"First Office Action of Co-pending U.S. Appl. No. 12/204,772", issued on Mar. 18, 2010, in which the listed references were cited.

"Final Office Action of Co-pending U.S. Appl. No. 12/204,772", issued on Aug. 27, 2010.

"First Office Action after Request for Continued Examination of Co-pending U.S. Appl. No. 12/204,772", issued on Jan. 3, 2011, in which the listed references were cited.

"Final Office Action after Request for Continued Examination of Co-pending U.S. Appl. No. 12/204,772", issued on Jun. 10, 2011.

"First Office Action after Second Request for Continued Examination of Co-pending U.S. Appl. No. 12/204,772", issued on Sep. 29, 2011, in which the listed references were cited.

"Second Office Action after Second Request for Continued Examination of Co-pending U.S. Appl. No. 12/204,772", issued on Feb. 3, 2012, in which the listed references were cited.

"Final Office Action of Co-pending U.S. Appl. No. 12/204,780", issued on Aug. 2, 2012, pp. 1-33, in which the listed references were cited.

* cited by examiner

MOBILE DEVICE WITH MULTIPLE OPERATING SYSTEMS AND METHOD FOR SHARING A WIRELESS COMMUNICATION MODULE BETWEEN OPERATING SYSTEMS THEREOF

CROSS-REFERENCE TO RELATED APPLICATION

This application claims the priority benefit of U.S. provisional application Ser. No. 60/970,244, filed on Sep. 5, 2007 by the same applicant. There are two co-pending US patent applications, U.S. application Ser. No. 12/204,772, entitled "METHOD AND SYSTEM FOR SUPPORTING NETWORK SHARING AND DATA SYNCHRONIZATION SIMULTANEOUSLY", and the U.S. application Ser. No. 12/204,780, entitled "MOBILE DEVICE WITH TWO OPERATING SYSTEMS AND METHOD FOR SHARING HARDWARE DEVICE BETWEEN TWO OPERATING SYSTEMS THEREOF", filed on the same date by the same applicant, both of which claim the priority benefit of the aforementioned US provisional application. All disclosure of the US provisional application and the co-pending US patent applications are incorporated herein by reference.

BACKGROUND OF THE INVENTION

1. Field of the Invention

The present invention generally relates to a mobile device supporting at least two operating systems (OS), in particular, to a method for sharing a positioning system between two operating systems.

2. Description of Related Art

Common mobile devices are generally divided into notebook personal computers and personal digital assistants (PDA). The notebook personal computers adopting x86 architecture and non-embedded operating systems have stronger computation ability and higher power consumption. The PDAs adopting embedded architecture and embedded operating systems have lower computation ability and less power consumption. Therefore, it has become a mainstream product design to integrate a notebook computer and a PDA into one mobile device, so as to combine the advantages of the two to improve the overall performance.

In the above mobile device, two central processing units (CPU) are installed for running two operating systems at the same time. One of the CPUs is used to run the non-embedded operating system (e.g. Microsoft Windows Vista®), and the other CPU is used to run the embedded operating system (e.g. Microsoft Windows Mobile®). The two operating systems can be run at the same time. Thus, a user can perform simple works, for example, schedule arrangement, contactor management, E-mail handling, and so on under the embedded operating system, so as to reduce power consumption. The user can also switch the mobile device to run the non-embedded operating system so as to perform word processing, audio-visual editing, and other resource-consuming works.

However, generally a wireless communication module provided by a mobile device, for example a global positioning system (GPS) module or a network communication module, can be used by only an individual operating system of the mobile device at a time. Therefore, as far as the mobile device supporting a plurality of operating systems is concerned, the individual operating systems cannot share the wireless communication module to receive data. Thus, in order to allow different operating systems supported by the mobile device to have the wireless communication function at the same time, manufacturers should arrange wireless signal receivers, for example, satellite positioning signal receivers or mobile network signal receivers, in the mobile device in accordance with the quantity of the operating systems. Consequently, the manufacturing cost, size, weight, and power consumption of the mobile device are inevitably increased, which goes against the current development trend of "light, thin, short, small", and power saving of the mobile devices.

SUMMARY OF THE INVENTION

Accordingly, the present invention is directed to a mobile device with a plurality of operating systems capable of sharing one wireless communication module.

The present invention is directed to a method for sharing a wireless communication module between two operating systems, in which the wireless communication module is shared between the two operating systems through transmitting a uniform message in an unified format.

The present invention provides a method for sharing a wireless communication module between two operating systems in a mobile device which is capable of running a first operating system and a second operating system. First, a wireless communication module receives a wireless signal, provides data according to the wireless signal, and transmits the data to the second operating system. Then, the second operating system encodes the data into a uniform message, and transmits the uniform message to the first operating system. Finally, the first operating system decodes the uniform message into the data.

The present invention further provides a mobile device capable of running the first operating system and the second operating system. The mobile device includes a wireless communication module and a hardware controller. The wireless communication module is used to receive a wireless signal, provide data according to the wireless signal, and transmit the data to the second operating system. The second operating system has a second driver for encoding the data into an uniform message. The hardware controller has a first communication interface and a second communication interface. The second communication interface is used to receive the uniform message from the second operating system, and the first communication interface is used to transmit the first uniform message received by the second communication interface to the first operating system. The first operating system has a first driver for decoding the first uniform message into the data.

In the present invention, a hardware controller is used to coordinate between at least two operating systems supported by the mobile device, such that all the operating systems can share the same wireless communication module. Each operating system has an exclusive driver serving as encoder/decoder, for encoding/decoding the instruction and the data communicating between the operating systems. Therefore, one wireless communication module is shared by the at least two operating systems, thereby saving the hardware cost and reducing the volume, the weight, and the power consumption of the mobile device.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
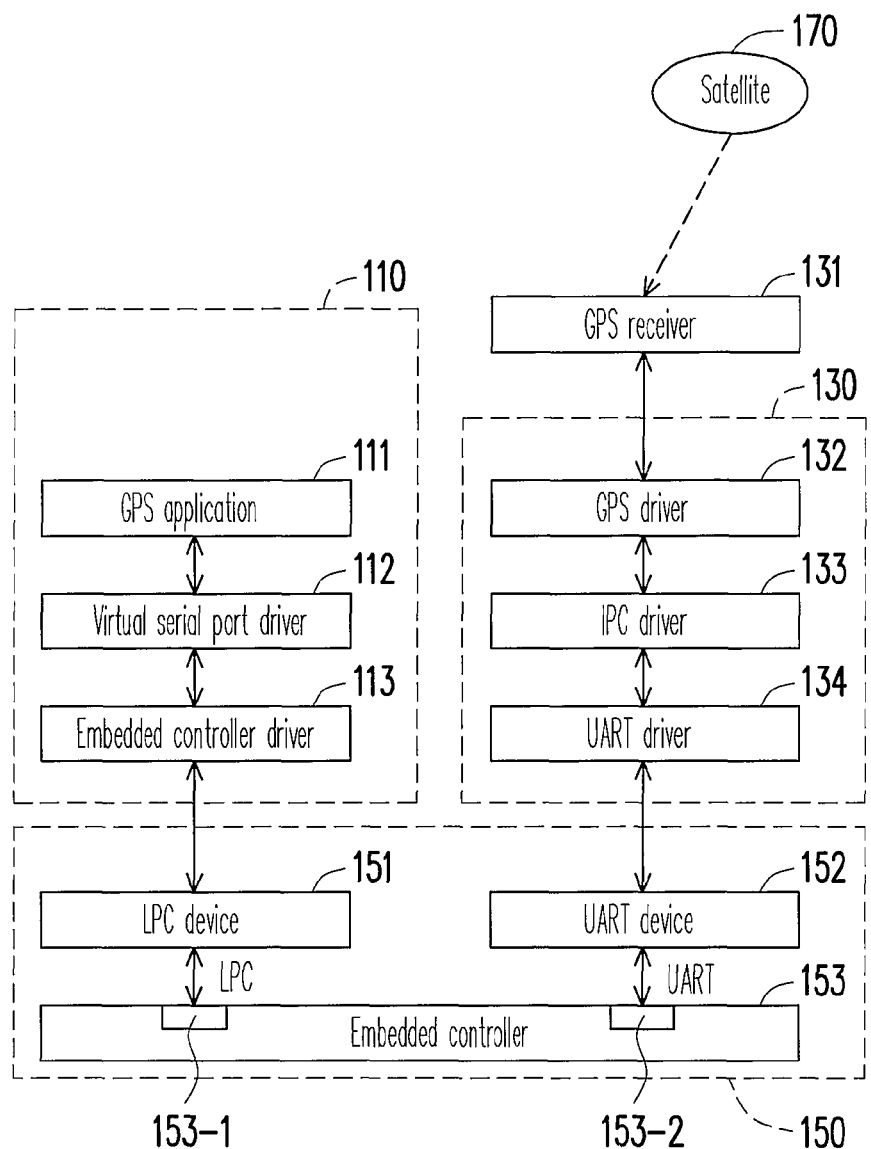
FIG. 1 is a block diagram of the mobile device according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a block diagram of the mobile device according to an embodiment of the present invention. Referring to FIG. 1, the mobile device is capable of running a first operating system 110 and a second operating system 130 at the same time. The first operating system 110 is a non-embedded operating system (e.g. Microsoft Windows Vista®), and the second operating system 130 is an embedded operating system (e.g. Microsoft Windows Mobile 6®). The first operating system 110 and the second operating system 130 share a common hardware module 150.

The embedded operating system 130 has a GPS receiver 131, that is, the GPS receiver 131 is disposed in a hardware system running the embedded operating system 130. The non-embedded operating system 110 can share the GPS receiver 131 with the embedded operating system 130 through an embedded controller 153 of the hardware module 150.

In the embodiment, the non-embedded operating system 110 includes a GPS application 111, a virtual serial port driver 112, and an embedded controller driver 113. The embedded operating system 130 includes a GPS driver 132, an inter-process communication (IPC) driver 133, and a universal asynchronous receiver transmitter (UART) driver 134. The GPS application 111 needs the GPS data to run for example an E-map display function or a navigation function.

The conventional GPS receiver is a hardware device connected to a physical serial port (e.g. COM port), so as to provide the mobile device with the GPS data through the physical serial port. The physical serial port is disposed in the hardware system running the non-embedded operating system. However, in this embodiment, the two operating systems 110, 130 are run on two different hardware systems respectively. The hardware system running the non-embedded operating system 110 is not provided with the physical serial port, and the GPS receiver 131 is connected to the hardware system running the embedded operating system 130. Therefore, the virtual serial port driver 112 receives the GPS data through the embedded controller 153 and provides one virtual serial port, so as to make the GPS application 111 to obtain the GPS data through accessing the virtual serial port. When the user activates the GPS application 111, the GPS application 111 sends an activation instruction, so as to make the GPS receiver 131 to start operation.

Figure 2:
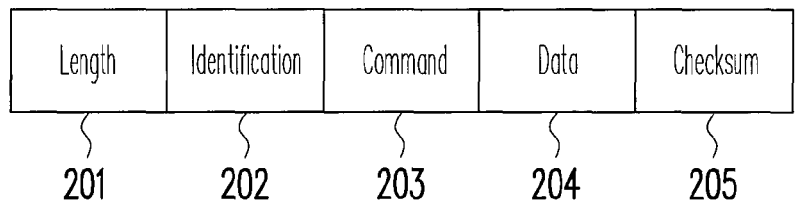
FIG. 2 is a schematic view of a uniform message format according to an embodiment of the present invention.

In order to achieve the communication between the non-embedded operating system 110 and the embedded operating system 130, a uniform message in a unified format is used to carry instructions and data transmitted between the operating systems 110 and 130. FIG. 2 is a schematic view of a uniform message format according to an embodiment of the present invention. Referring to FIG. 2, the uniform message has the same format between the two operating systems 110, 130. The embedded controller driver 113 and the IPC driver 133 respectively serve as the encoder/decoder of the uniform message in the non-embedded operating system 110 and the embedded operating system 130.

The uniform message includes four major fields, namely a length field 201, an identification field 202, a command field 203, and a checksum field 205. In addition, the uniform message further includes an optional data field 204. The length field 201 records the byte length of the uniform message. The identification field 202 records the source and the destination of the uniform message, and the source and the destination can be either the operating system 110 or the operating system 130. The command field 203 records the instruction format. The data field 204 records positioning data obtained by the GPS receiver 131. The checksum in the checksum field 205 is used to confirm the completeness of the uniform message.

Figure 3:
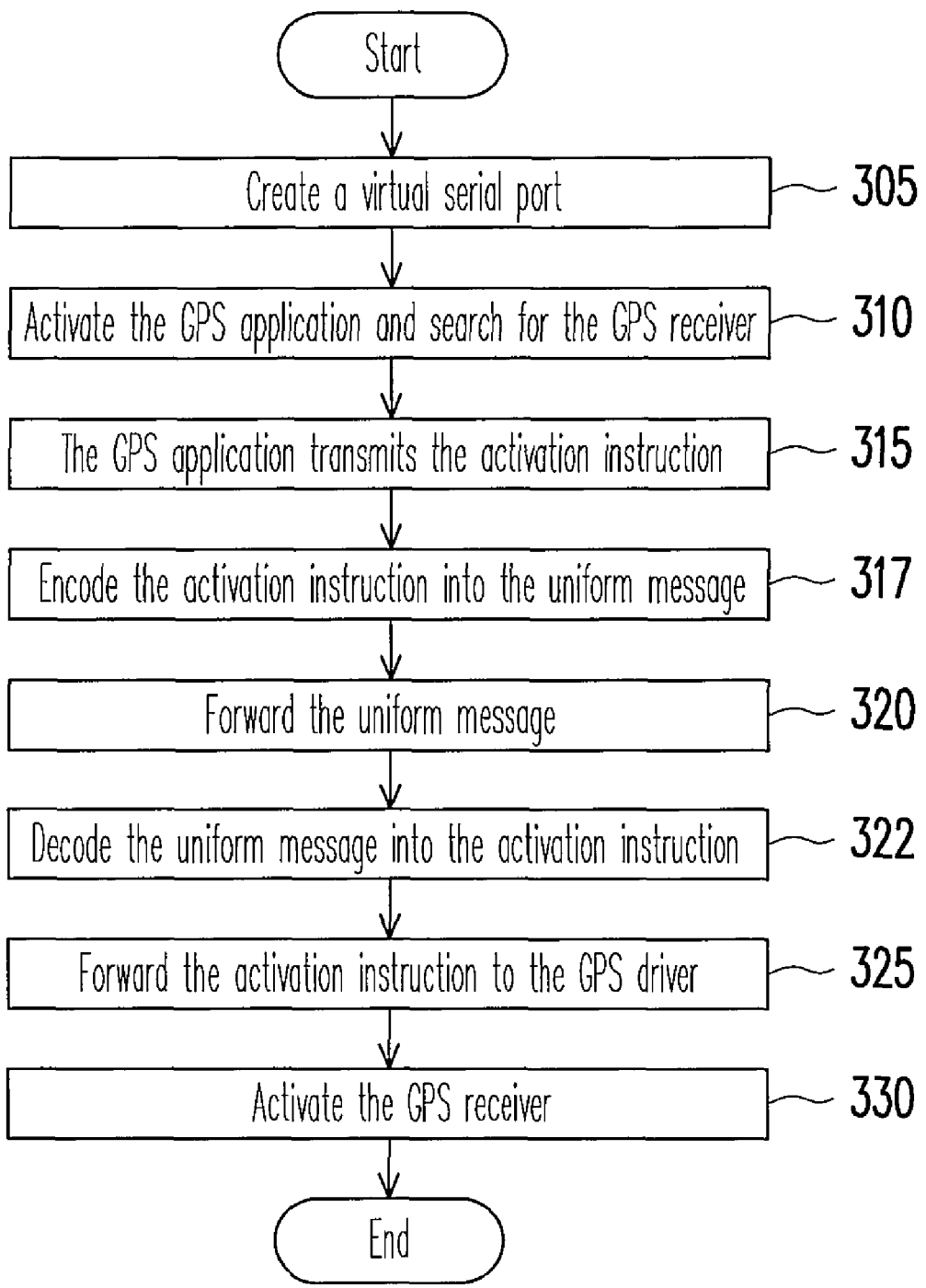
FIG. 3 is a flow chart of a method for activating the GPS system according to an embodiment of the present invention.

Hereinafter, the steps of activating the GPS receiver 131 is described in detail together with the mobile device. FIG. 3 is a flow chart of a method for activating the GPS system according to an embodiment of the present invention. Referring to FIGS. 1 and 3, first, the virtual serial port driver 112 is installed in the non-embedded operating system 110, so as to create one virtual serial port (e.g. virtual COM port) through the virtual serial port driver 112 (step 305). The virtual serial port simulates a physical serial port directly connected to the GPS receiver 131.

Next, when the user activates the GPS application 111, the GPS application 111 scans all the serial ports (including the virtual serial port) for searching for the GPS receiver 131 (step 310). After finding the virtual serial port, the GPS application 111 transmits an activation instruction to the virtual serial port (step 315). Then, the activation instruction is transmitted to the embedded controller driver 113 through the virtual serial port driver 112. After the embedded controller driver 113 encodes the activation instruction into the uniform message, the uniform message is transmitted to a low pin count (LPC) device 151. Then, the embedded controller 153 receives the uniform message from the LPC device 151 through an LPC interface 153-1 (step 317).

Afterwards, the embedded controller 153 transmits the uniform message to the IPC driver 133 through a UART interface 153-2 (step 320). The IPC driver 133 obtains the uniform message through the UART device 152 and the UART driver 134. Next, the IPC driver 133 decodes the uniform message into the activation instruction (step 322), and forwards the activation instruction to the GPS driver 132 (step 325). The GPS driver 132 receives the activation instruction and the drives the GPS receiver 131 to start operation, such that the GPS receiver 131 starts to receive the GPS signal and provides GPS data (step 330).

Figure 4:
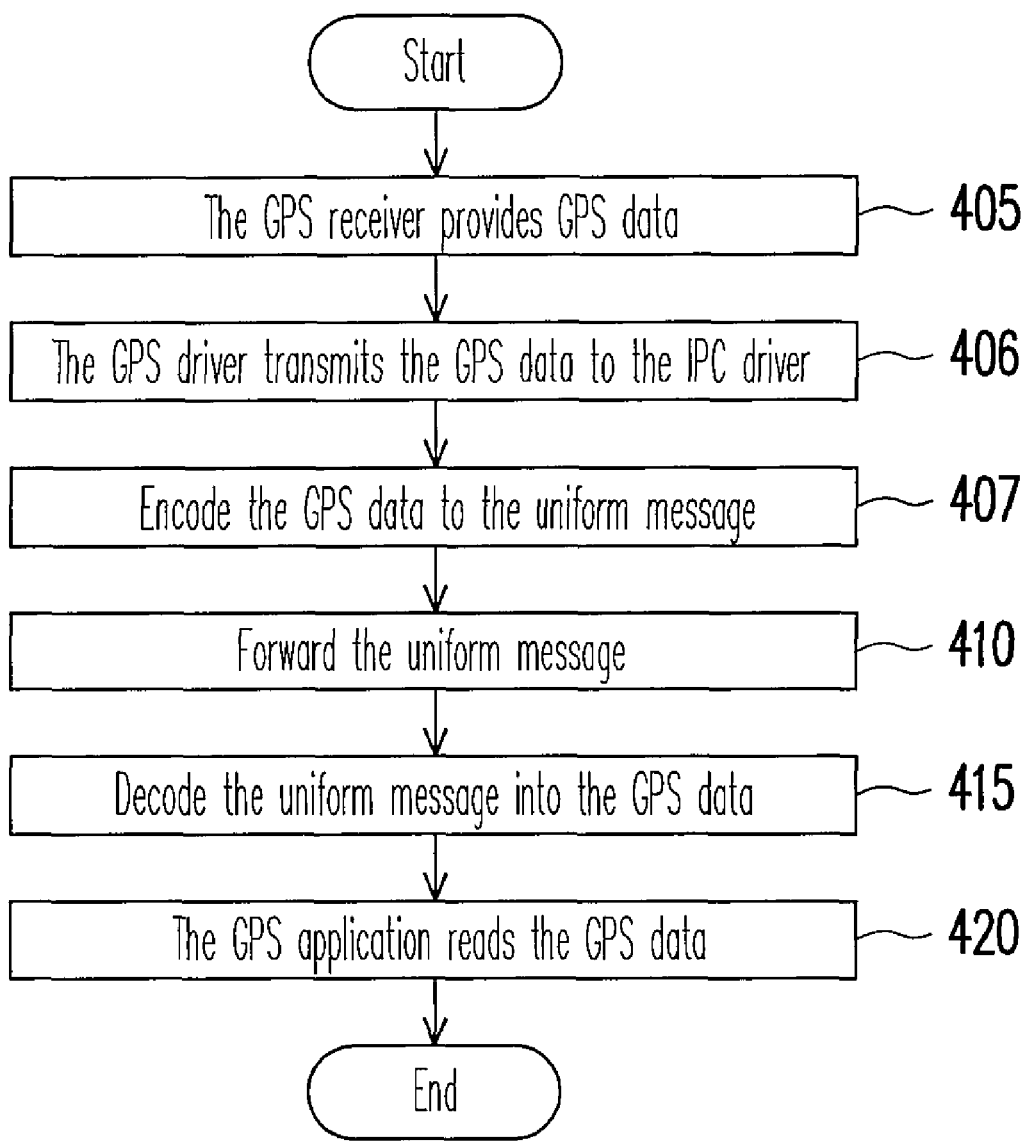
FIG. 4 is a flow chart of a method of transmitting positioning data according to an embodiment of the present invention.

After the initialization procedure of FIG. 3, the GPS receiver 131 continuously transmits the GPS data. FIG. 4 is a flow chart of a method of transmitting positioning data according to an embodiment of the present invention. Referring to FIGS. 1 and 4, first, according to the GPS signal received from the satellite 170, the GPS receiver 131 provides the GPS data to the GPS driver 132 of the embedded operating system 130 (step 405). For example, the GPS data may be a GPS NMEA data conforming to the national marine electronics association (NMEA) standard.

Next, the GPS driver 132 transmits the GPS data to the IPS driver 133 (step 406). The IPC driver 133 then encodes the GPS data into the uniform message and transmits the uniform message to the embedded controller 153 (step 407). The embedded controller 153 receives the uniform message from the IPC driver 133 with the UART interface 153-2 through the UART driver 134 and the UART device 152. Then, the embedded controller 153 checks the identification field 202 of the uniform message, and transmits the uniform message to the non-embedded operating system 110 through the LPC interface 153-1 according to the destination (i.e. the non-embedded operating system 110) recorded in the identification field 202 (step 410). In addition, before the embedded controller 153 transmits the uniform message to the non-embedded operating system 110, the embedded controller 153 sends an interruption to inform the embedded controller driver 113.

Then, the embedded controller driver 113 obtains the uniform message from the LPC interface 153-1 of the embedded controller 153 through the LPC device 151. Next, the embedded controller driver 113 checks the command field 203, so as to identify that the uniform message carries the GPS data. Therefore, the embedded controller driver 113 decodes the uniform message into the GPS data, and forwards the GPS data to the virtual serial port driver 112 (step 415). The GPS application 111 accesses the GPS data from the virtual serial port through the virtual serial port driver 112, and runs an E-map display function or a navigation function according to the GPS data (step 420).

Figure 5:
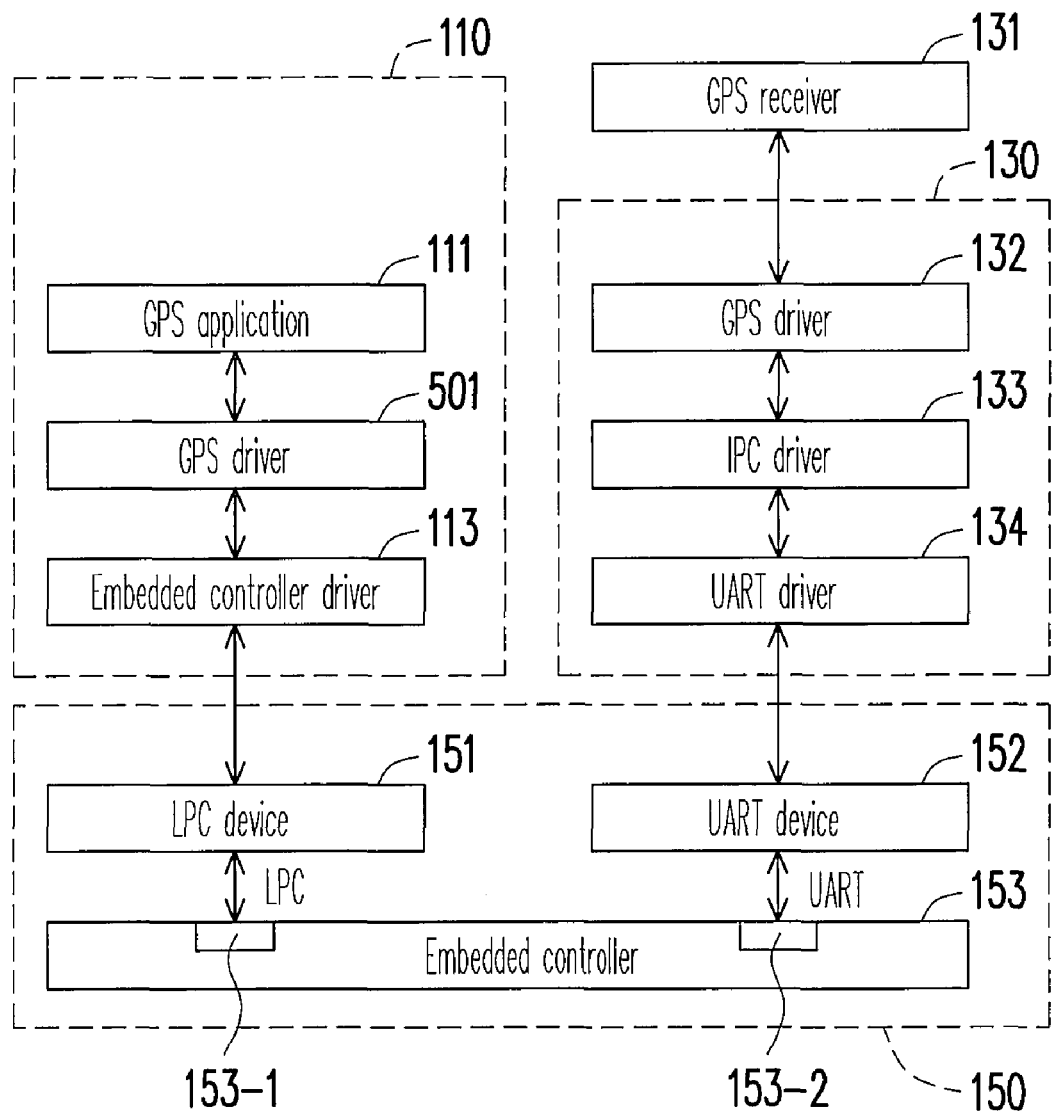
FIG. 5 is a block diagram of the mobile device according to another embodiment of the present invention.

In the above embodiment, in order to achieve the compatibility with the general GPS application, the virtual serial port is installed. However, a GPS application that does not need any physical or virtual serial port can also be employed. For example, another GPS driver may be installed to communicate with the GPS application. For example, FIG. 5 is a block diagram of the mobile device according to another embodiment of the present invention. Referring to FIG. 5, in this embodiment, elements with the same numbers as those in FIG. 1 indicate identical elements. The GPS application 111 obtains the positioning data from the GPS driver 501, and the GPS driver 501 obtains the GPS data through the embedded controller driver 113.

In addition, by the support of the embedded controller 153, the embedded operating system 130 may also share hardware devices installed in the hardware system running the non-embedded operating system 110. For example, if the GPS receiver is an exclusive hardware of the non-embedded operating system 110, the embedded operating system 130 can also share the GPS receiver through the embedded controller 153.

Figure 6:
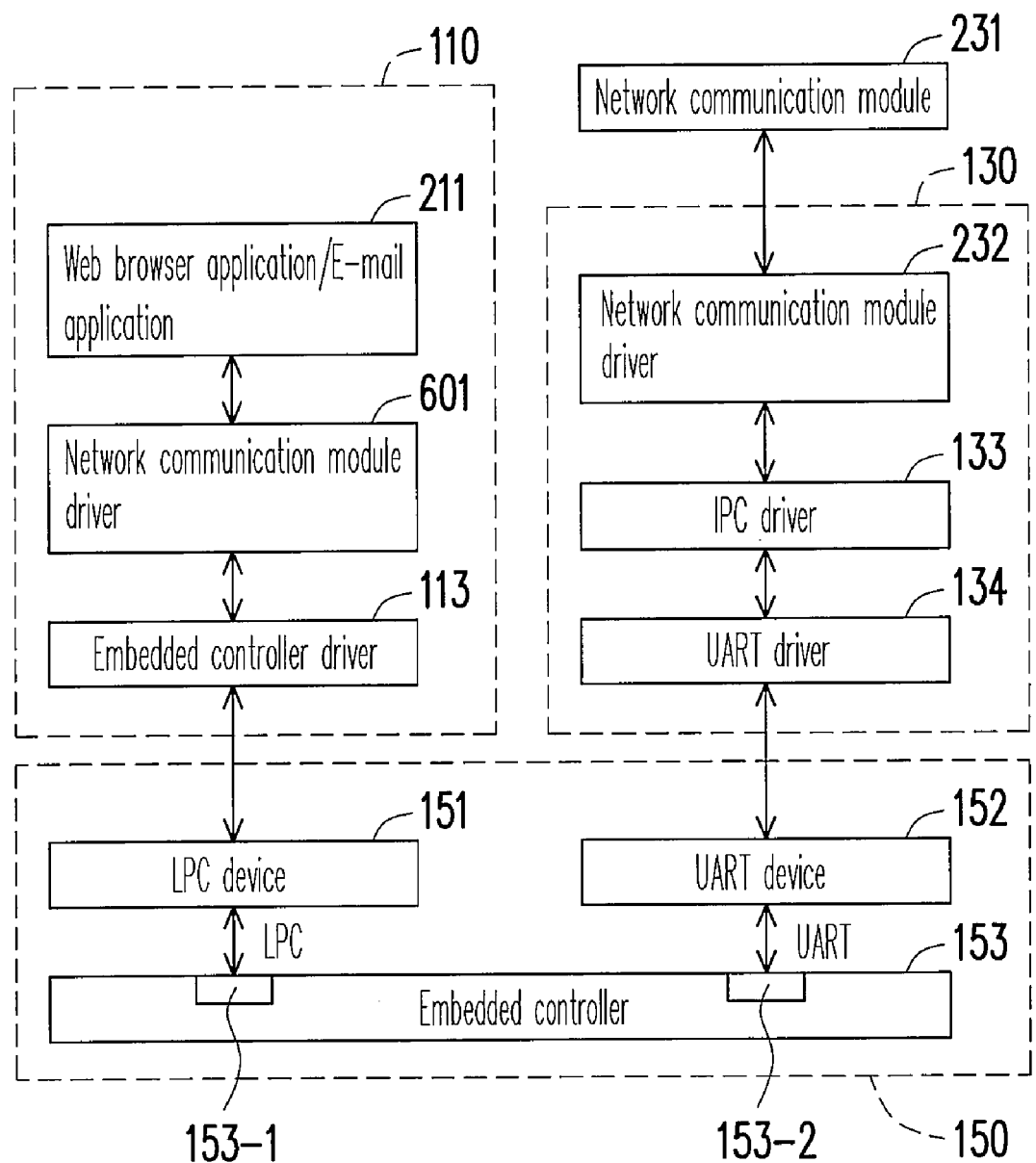
FIG. 6 is a block diagram of the mobile device according to another embodiment of the present invention.

Further, in the embodiment of the present invention, the hardware device shared by the non-embedded operating system 110 and the embedded operating system 130 is not limited to the GPS receiver and can be other wireless communication module, such as a network communication module, for receiving a wireless signal, so as to achieve the purpose of sharing the hardware device in the manner described in the above embodiment. For example, FIG. 6 is a block diagram of the mobile device according to another embodiment of the present invention. Referring to FIG. 6, in this embodiment, elements with the same numbers as those in FIG. 5 indicate identical elements. The non-embedded operating system 110 can use a network communication module 231 operated under the embedded operating system 130 in the same manner described in the embodiment of FIG. 5 to establish a connection to a wireless communication network through communication standards e.g. general packet radio service (GPRS) network, enhanced data rates for GSM evolution (EDGE) network, 3G (e.g. CDMA2000 and WCDME) network, or 3.5G (e.g. HSDPA) network supported by the network communication module 231, so as to receive network data and transmit the network data to the embedded operating system 130. Accordingly, the non-embedded operating system 110 can activate a web browser application or an E-mail application 211 to browse Internet or receive/send E-mails after the network communication module 231 establishes a connection to the wireless communication network. In this embodiment, a network communication module driver 232 receives online data through the network communication module 231 and transmits the received online data to the IPC driver 133. The web browser application/E-mail application 211 obtains the online data through the network communication module driver 601, and the network communication module driver 601 obtains the online data transmitted from the IPC driver 133 and forwarded by the embedded controller 153 through the embedded controller driver 113.

In view of the above, in the embodiment, the embedded controller enables different operating systems to share the same wireless communication module. In this manner, only one wireless communication module is disposed in the mobile device, and can be shared between the operating systems supported by the mobile device. Thus, the hardware cost of the mobile device can be reduced, and further the "light, thin, short, and small" principle is realized and the power consumption is reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for sharing a wireless communication module between two operating systems (OS) in a mobile device which is capable of running a first operating system and a second operating system, the method comprising:
   activating an application on the first operating system;
   receiving a wireless signal by the wireless communication module, providing data according to the wireless signal, and transmitting the data to the second operating system;
   encoding the data into a first uniform message by the second operating system and transmitting the first uniform message to the first operating system;
   decoding the first uniform message into the data by the first operating system; and
   reading the decoded data by the application from a wireless communication module driver installed in the first operating system.

2. The method for sharing a wireless communication module between two operating systems according to claim 1, wherein the step of activating the application on the first operating system further comprises:
   sending an instruction to the second operating system from the application; and
   driving the wireless communication module to start receiving the wireless signal according to the instruction.

3. The method for sharing a wireless communication module between two operating systems according to claim 2, wherein the step of sending the instruction to the second operating system from the application further comprises:
   encoding the instruction into a second uniform message and transmitting the second uniform message to the second operating system.

4. The method for sharing a wireless communication module between two operating systems according to claim 3, further comprising:
   decoding the second uniform message into the instruction by the second operating system.

5. The method for sharing a wireless communication module between two operating systems according to claim 3, before the step of encoding the instruction into the second uniform message, further comprising:
   creating a virtual communication interface and searching for the wireless communication module through the virtual communication interface.

6. The method for sharing a wireless communication module between two operating systems according to claim 5, after the step of decoding the first uniform message into the data by the first operating system, further comprising:
   transmitting the decoded data to the virtual communication interface and reading the decoded data by the application from the virtual communication interface.

7. The method for sharing a wireless communication module between two operating systems according to claim 1, wherein the wireless communication module is a positioning receiver, and the data is positioning data.

8. The method for sharing a wireless communication module between two operating systems according to claim 7, after the step of transmitting the decoded data to the application, further comprising:
   running a navigation function by the application according to the positioning data.

9. A mobile device, capable of running a first operating system and a second operating system, comprising:
   a wireless communication module for receiving a wireless signal, providing data according to the wireless signal, and transmitting the data to the second operating system, wherein the second operating system comprises a second driver for encoding the data into a first uniform message; and
   a hardware controller comprising a first communication interface and a second communication interface, wherein the second communication interface is used to receive the uniform message from the second operating system, and the first communication interface is used to transmit the first uniform message received by the second communication interface to the first operating system; wherein the first operating system comprises an application, a first driver for decoding the first uniform message into the data, and a wireless communication module driver for receiving the data decoded by the first driver, wherein the application obtains the decoded data through the wireless communication module driver and runs a navigation function according to the data.

10. The mobile device according to claim 9, wherein the first communication interface is a low pin count (LPC) interface, and the second communication interface is a universal asynchronous receiver transmitter (UART) interface.

11. The mobile device according to claim 9, wherein the first uniform message comprises a data field and an identification field, the data field is used to record the data, and the identification field is used to record a destination to which the uniform message is transmitted, and the destination is the first operating system.

12. The mobile device according to claim 11, wherein the hardware controller transmits the first uniform message to the first operating system according to the identification field.

13. The mobile device according to claim 9, wherein the application is further used to send an instruction, and the first driver is further used to encode the instruction into a second uniform message and then transmit the second uniform message to the second operating system through the hardware controller;
   wherein the second driver is further used to decode the second uniform message into the instruction for driving the wireless communication module.

14. The mobile device according to claim 13, wherein the second uniform message comprises a command field and an identification field, the command field is used to record the instruction, the identification field is used to record a destination to which the second uniform message is transmitted, and the destination is the second operating system.

15. The mobile device according to claim 13, wherein the first operating system further comprises:
   a virtual communication interface driver for creating a virtual communication interface in the first operating system, wherein the application searches for the wireless communication module through the virtual communication interface.

16. The mobile device according to claim 13, wherein the wireless signal is a global positioning system (GPS) signal.

* * * * *